US011768727B2

(12) United States Patent
Misra et al.

(10) Patent No.: US 11,768,727 B2
(45) Date of Patent: Sep. 26, 2023

(54) REDUCING OVER-REPORTING OF SERVICEABLE EVENTS

(71) Applicant: International Business Machines Corporation, Armonk, NY (US)

(72) Inventors: Sampa Misra, Bangalore (IN); Deepak Kodihalli, Bangalore (IN); Giridhari Krishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/533,227

(22) Filed: Nov. 23, 2021

(65) Prior Publication Data
US 2023/0161659 A1 May 25, 2023

(51) Int. Cl.
*G06F 11/07* (2006.01)

(52) U.S. Cl.
CPC ........ *G06F 11/0781* (2013.01); *G06F 11/079* (2013.01); *G06F 11/0709* (2013.01); *G06F 11/0793* (2013.01)

(58) Field of Classification Search
CPC ............. G06F 11/0766; G06F 11/0781; G06F 11/079; G06F 11/0793; G06F 11/3072; H04L 41/0604; H04L 41/0609; H04L 41/0613; H04L 41/0622; H04L 41/0627; H04L 41/0631; H04L 41/069
See application file for complete search history.

(56) References Cited

U.S. PATENT DOCUMENTS

| | | | |
|---|---|---|---|
| 8,417,809 B1 * | 4/2013 | Lancaster | G06F 11/0781 709/224 |
| 9,594,622 B2 | 3/2017 | Bohn | |
| 10,552,245 B2 | 2/2020 | McBride | |
| 10,599,505 B1 * | 3/2020 | Hijazi | G06F 11/0709 |
| 2001/0002173 A1 * | 5/2001 | Sanada | G11C 16/16 365/185.29 |
| 2001/0005633 A1 * | 6/2001 | Wang | H10B 69/00 438/689 |
| 2001/0006847 A1 * | 7/2001 | Wang | H01L 23/485 257/E23.145 |
| 2001/0037358 A1 * | 11/2001 | Clubb | H04L 63/0407 709/203 |

(Continued)

OTHER PUBLICATIONS

Disclosed Anonymously, "Incident Based Model for Intelligently Combining Related Call Home Events into a Single Service Ticket", An IP.com Prior Art Database Technical Disclosure, IP.com No. IPCOM000243423D, IP.com Electronic Publication Date: Sep. 21, 2015, 4 pages.

(Continued)

*Primary Examiner* — Gabriel Chu
(74) *Attorney, Agent, or Firm* — Stosch Sabo

(57) ABSTRACT

Described are techniques including a computer-implemented method of determining, by a service processor, that a first set of callouts of a first error log matches a previous set of callouts of a previous error log. The method further comprises combining the first error log with the previous error log in a first group in a service processor log of the service processor. The method further comprises transmitting information related to the first group to a management console communicatively coupled to the service processor.

20 Claims, 4 Drawing Sheets

(56) References Cited

U.S. PATENT DOCUMENTS

| | | | | |
|---|---|---|---|---|
| 2002/0059078 | A1* | 5/2002 | Valdes | H04L 41/0631 705/1.1 |
| 2002/0120736 | A1* | 8/2002 | Stuart Martin | H04L 41/0213 709/224 |
| 2002/0165953 | A1* | 11/2002 | Diong | H04L 9/40 709/224 |
| 2003/0110398 | A1* | 6/2003 | Dacier | H04L 63/20 709/224 |
| 2003/0208656 | A1* | 11/2003 | Hawkins | G06F 11/0751 711/165 |
| 2004/0073806 | A1* | 4/2004 | Zimmer | G06F 21/575 713/189 |
| 2006/0217995 | A1 | 9/2006 | Sagnak | |
| 2007/0097130 | A1* | 5/2007 | Margulis | G06T 1/20 345/501 |
| 2008/0137823 | A1* | 6/2008 | Abichandani | H04L 12/66 379/106.01 |
| 2013/0111502 | A1* | 5/2013 | Carey | G06F 11/3072 719/318 |
| 2014/0081925 | A1* | 3/2014 | Haeberle | G06F 16/174 707/E17.009 |

OTHER PUBLICATIONS

Disclosed Anonymously, "Method and System for Building a Unified Call-Home and/or Error Log Analysis Tool", An IP.com Prior Art Database Technical Disclosure, IP.com No. IPCOM000239804D, IP.com Electronic Publication Date: Dec. 2, 2014, 5 pages.

* cited by examiner

REDUCING OVER-REPORTING OF SERVICEABLE EVENTS

BACKGROUND

The present disclosure relates to data processing system maintenance, and, more specifically, to error log management in data processing systems.

Data processing systems can be configured to generate error logs to identify failures, faults, and other errors in components of data processing systems. However, a single component failure can cause numerous error logs to be generated by the failed component and other components that communicate with, rely upon, or are otherwise associated with the failed component.

SUMMARY

Aspects of the present disclosure are directed toward a computer-implemented method of determining, by a service processor, that a first set of callouts of a first error log matches a previous set of callouts of a previous error log. The method further comprises combining the first error log with the previous error log in a first group in a service processor log of the service processor. The method further comprises transmitting information related to the first group to a management console communicatively coupled to the service processor.

Further aspects of the present disclosure are directed toward a system comprising a Baseboard Management Controller (BMC) communicatively coupled to a plurality of servers. The BMC comprises a log daemon configured to scan incoming error logs from the plurality of servers, where the log daemon creates callout chains of callouts of the incoming error logs. The BMC further comprises a Flash memory storing a service processor log including a plurality of groups of error logs, where a first group of error logs contains at least two error logs that have matching callout chains.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
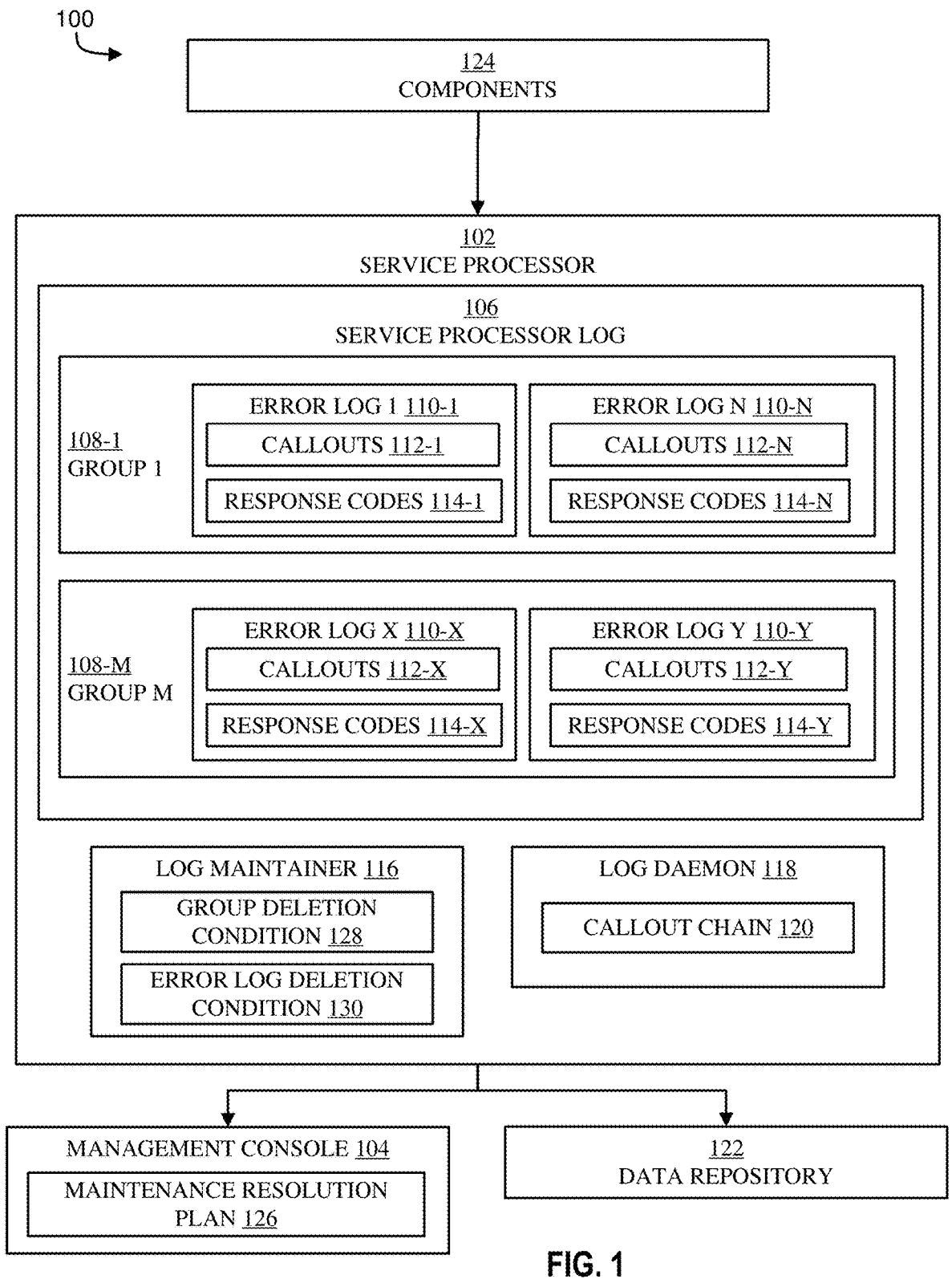
FIG. 1 illustrates a block diagram of an example system for efficiently maintaining error logs, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data processing system maintenance, and, more specifically, to error log management in data processing systems. While not limited to such applications, embodiments of the present disclosure may be better understood in light of the aforementioned context.

A functionality available in some data processing systems is call-home, and it provides round-the-clock monitoring of connected data processing systems, thereby increasing overall system availability. Call-home can be used to automatically transmit error information to a management console in order to enable prompt automated or manual resolution of errors. However, functionalities such as call-home can over-report incidents by transmitting redundant error information generated from multiple components that are connected to a single failed component.

Error logs (also referred to as serviceable logs) can be reported to a hardware management console (HMC) by a service processor (e.g., a Baseboard Management Controller (BMC)), and the HMC can trigger an automated support call to service engineers. In some situations, a call-home can be triggered based on a unique response code of each error. However, some error logs can be related to a same error (e.g., serviceable event) such as when multiple components report error logs for a single failure. As another example, a first failure in a chain of failures can be the root of all subsequent issues. In these cases, error logs can be generated for each distinct component failure despite all subsequent component failures being caused by the first failure. Regardless, all associated components that are affected by any failure can report a serviceable event via an error log, and a call-home can be issued for each of those serviceable events. However, from the point of view of the HMC, related serviceable events can be resolved by fixing the initial failure (e.g., root cause), so a single service request is enough to resolve the situation. Thus, there is a need to reduce over-reporting of error events in data processing systems.

Aspects of the present disclosure are directed toward reducing over-reporting of error events by grouping error logs with similar callouts. Some embodiments of the present disclosure can define the identity of an error according to a callout field of the error log, and all related error logs (with similar callout fields) can be put into a single group and one call-home can be initiated for each group. In some embodiments, aspects of the present disclosure can distinguish groups of error logs that require resolution by customers (e.g., altering configuration settings) from error logs that require resolution by developers (e.g., debugging).

Some embodiments of the present disclosure can utilize a field in the service processor log called a Group Identifier (GID). A service processor log maintainer can create a new GID, or apply a previously assigned GID, to each received error log. For example, an error log can have its GID set to a preexisting GID of a grouped set of error logs with matching callouts, or the error log can be assigned a new GID (e.g., the EID of the error log) if there are no other GIDs with error logs having a matching set of callouts.

A service processor log can maintain an in-memory data structure table that contains error log information and uses the GID as the primary key. A first example group in the service processor log can contain information such as: <Group Id 1; List of location codes; List of system reference codes; List of EIDs falling into this group>. A second example group in the service processor log can contain information such as: <Group Id 2; List of Location codes; List of system reference codes; List of EIDs falling into this group>. Thus, in some embodiments, each group in the service processor log can include at least the following information: GID, location codes of each associated error log in the GID, system reference codes of each associated error log in the GID, and EIDs of each associated error log in the GID.

In operation, upon receipt of a first error log, the log maintainer in the service processor can assign the EID of the received error log as a GID of a new group of error logs. Furthermore, in some embodiments, callouts of the received error log can be documented by listing all the location codes and the primary response code (and any additional response codes) of the received error log. Upon receipt of a next error log, the callouts of the next error log can be scanned along with the location codes. In some embodiments, a callout chain of the next error log is created and compared to callout chain of previous error logs. As an example, the first error log can have a callout chain of identifiers of Field Replaceable Units (FRUs) such as <FRU_A→FRU_B→FRU_C→FRU_D>. Meanwhile, the next error log can have a callout chain of <FRU_A→FRU_B→FRU_C>. Insofar as the entirety of one chain (e.g., the next error log callout chain) matches at least a subset of another chain (e.g., the first error log callout chain), a match can be identified between the callout chains of the first error log and the next error log, and the first error log and the next error log can be put into the same group (e.g., the group established by the first error log).

In some embodiments, the next error log can have a callout chain that matches with two or more GIDs. If so, then the response codes may be compared between the next error log and response codes of each GID with a matching callout chain. The next error log can be placed into the GID with matching response codes. In some embodiments, both primary and secondary response codes can be compared to determine a match.

In some embodiments, a single call-home occurs for each GID. Once a call-home is initiated, the GID can be deleted from the service processor log if: (i) the call-home is processed or the service request is done (e.g., by receiving an acknowledgement (ack) at the service processor and from the HMC); (ii) a check stop has been hit in the service processor (which can indicate a stop in a chain of failures); and/or (iii) no newer error log is received for a specific time period.

Furthermore, some embodiments of the present disclosure provide for removing redundant information in each GID by deleting less than all error logs from each GID. For example, in some embodiments, all the error logs in a GID can be deleted except the first log for each group. In some embodiments, any deleted error logs are first transmitted to an external data repository prior to deletion. Doing so can preserve information in the event developers would benefit from reviewing all error logs when debugging an issue.

Furthermore, error logs that are reported as critical, but needed only for debugging purposes, can be placed in a GID that is configured to not perform a call-home insofar as such error logs do not trigger a serviceable event.

Advantageously, aspects of the present disclosure can reduce the number of unnecessary call-homes, thereby reducing networking overhead (e.g., communication between a service processor and a management console) and improving speed and accuracy of error resolution at the management console (e.g., by automatically grouping related errors). Furthermore, some embodiments of the present disclosure utilize automated deletion of processed groups and/or consolidation of error logs within groups in order to reduce the amount of storage consumed by a service processor (e.g., a Flash storage device of a BMC).

Referring now to the figures, FIG. 1 illustrates a block diagram of an example system 100 for efficiently maintaining error logs, in accordance with some embodiments of the present disclosure. The system 100 includes a service processor 102. In some embodiments, the service processor 102 is a BMC. In other embodiments, the service processor 102 can be a dedicated computational device for managing error logs, where the dedicated computational device can comprise tangible and/or virtually provisioned computational resources, storage resources, and/or networking resources.

The service processor 102 can be communicatively coupled to a plurality of components 124. The plurality of components 124 can be, for example, servers, computers, laptops, tablets, smartphones, endpoint devices, other data processing devices, or combinations of the aforementioned devices. The components 124 can be individually made up of FRUs, processors, volatile memory, non-volatile memory, buses, networking components, peripheral components, and the like. In some embodiments, the plurality of components 124 can generate error logs for failures, errors, faults, or other malfunctions that are aggregated at the service processor 102.

The service processor 102 can store error logs aggregated from the components 124 in a service processor log 106. In some embodiments, the service processor log 106 is maintained in a memory (e.g., Flash memory) of the service processor 102. The service processor log 106 can organize the aggregated error logs into groups 108 such as group 1 108-1 through group M 108-M (where M can be any integer representing any number of groups 108 such as several, tens, hundreds, thousands, etc.). The aggregated error logs can be organized into groups 108 based on error log similarity. To do so, a log daemon 118 can generate a callout chain 120 for each of the aggregated error logs. Callout chain 120 can summarize a sequence of errors reported in each error log. Error logs with matching callout chains 120 can be organized into a same group 108. For example, group 1 108-1 includes error log 1 110-1 through error log N 110-N (where N can be any integer representing any number of error logs 110 such as several, tens, hundreds, thousands, etc.). Error log 1 110-1 includes callouts 112-1 and response codes 114-1. Similarly, error log N 110-N includes callous 112-N and response codes 114-N.

As discussed in the present disclosure, callouts 112 can refer to a type of error, an identifier of a failed component, an error code, or the like. For example, a callout can be "fan failure," or "database down." In such examples, the callouts 112 can include more detailed information such as an identifier of a failed fan, or an identifier of a database that is non-functional. Response codes 114 can refer to types of resolutions for an identified error. For example, response codes 114 can indicate replacement of a piece of hardware, reconfiguration of settings, or the like. Although not shown, error log 1 110-1 through error log N 110-N can also include other information such as times, location codes, hardware and/or software identifiers, software and/or firmware versions, and other relevant information.

Similarly, group M 108-M can include error log X 110-X through error log Y 110-Y, where error log X 110-X includes callouts 112-X and response codes 114-X, and where error log Y 110-Y includes callouts 112-Y and response codes 114-Y. Group M 108-M can have more, fewer, or the same number of error logs as group 1 108-1. Regardless, error logs in a same group can have matching callout chains 120. For example, error log 1 110-1 and error log N 110-N can have matching callout chains 120, error log X 110-X and error log Y 110-Y can have matching callout chains 120, and the callout chains 120 of error logs in group 1 108-1 can be different than the callout chains 120 of error logs in group 2 108-2.

Advantageously, grouping error logs 110 with matching callout chains 120 can reduce over-reporting of serviceable events. For example, a serviceable event can be an error in an error log 110 requiring replacement of a failed FRU. However, such an error can be reported in multiple error logs 110 from the failed FRU, another aspect of the same component 124 as the failed FRU, or from another component 124 that interacts with the failed FRU. Regardless, multiple error logs 110 reporting on the same error can have matching callout chains 120, and thus, aspects of the present disclosure can group multiple error logs 110 reporting on the same error in a same group 108. As a result, the service processor 102 can report the error to a management console 104 by a group 108 of related error logs 110 rather than by a plurality of error logs. Consolidating the reporting of a same error into a single group 108 can increase efficiency by reducing the overhead associated with manually correlating multiple error logs 110 and identifying a root cause of all the error logs 110.

The service processor 102 can transmit information related to one or more of the groups 108 to the management console 104 by a network connection (e.g., Ethernet). The management console 104 can generate a maintenance resolution plan 126 for each group 108 it receives. The maintenance resolution plan 126 can include automated mitigation actions (e.g., temporarily ceasing activity on one or more components 124 (or aspects of a specific component 124), reconfiguring a component 124 to utilize a redundant device to provide functionality in place of a failed device, and the like. The maintenance resolution plan 126 can also include instructions for a service technician to update, correct, replace, configure, reconfigure, or otherwise resolve an error in one or more of the components 124.

Referring back to the service processor 102, the service processor 102 can also include a log maintainer 116. The log maintainer 116 can be configured to efficiently store data in the service processor log 106. As one example, the log maintainer 116 can delete groups 108 after the groups 108 have been transmitted to the management console 104 and in response to satisfying a group deletion condition 128 (e.g., receiving an acknowledgement from the management console 104, receiving an indication of a check stop, after a predetermined time threshold has expired, etc.). Advantageously, deleting groups after being transmitted to the management console 104 and satisfying a group deletion condition 128 can reduce the number of groups 108 stored in the service processor log 106.

Furthermore, the log maintainer 116 can delete individual error logs 110 within groups 108 according to an error log deletion condition 130. The error log deletion condition 130 can be satisfied when less than all of the error logs 110 in a group 108 are transmitted to a data repository 122. The transmitted error logs can then be deleted. In this way, each group 108 still retains at least one error log 110 with the relevant callouts 112 for identifying the error related to each of the error logs 110 in a same group 108. Advantageously, deleting less than all of the error logs 110 within a group 108 can reduce the number of error logs 110 stored in the service processor log 106, reduce the network overhead associated with transmitting information related to the group 108 to the management console 104, and retain the necessary information for resolving the error. Furthermore, any deleted error log can be first backed up to a lower cost storage solution in the data repository 122 for future reference.

As will be appreciated by one skilled in the art, the log maintainer 116 and log daemon 118 can be embodied in computer-executable program code stored in storage resources of the service processor 102 and implemented using computational resources of the service processor 102. Likewise, the components 124, service processor 102, management console 104, and data repository 122 can be directly or indirectly communicatively coupled to one another through one or more network connections that are continuous or intermittent in nature.

Figure 2:
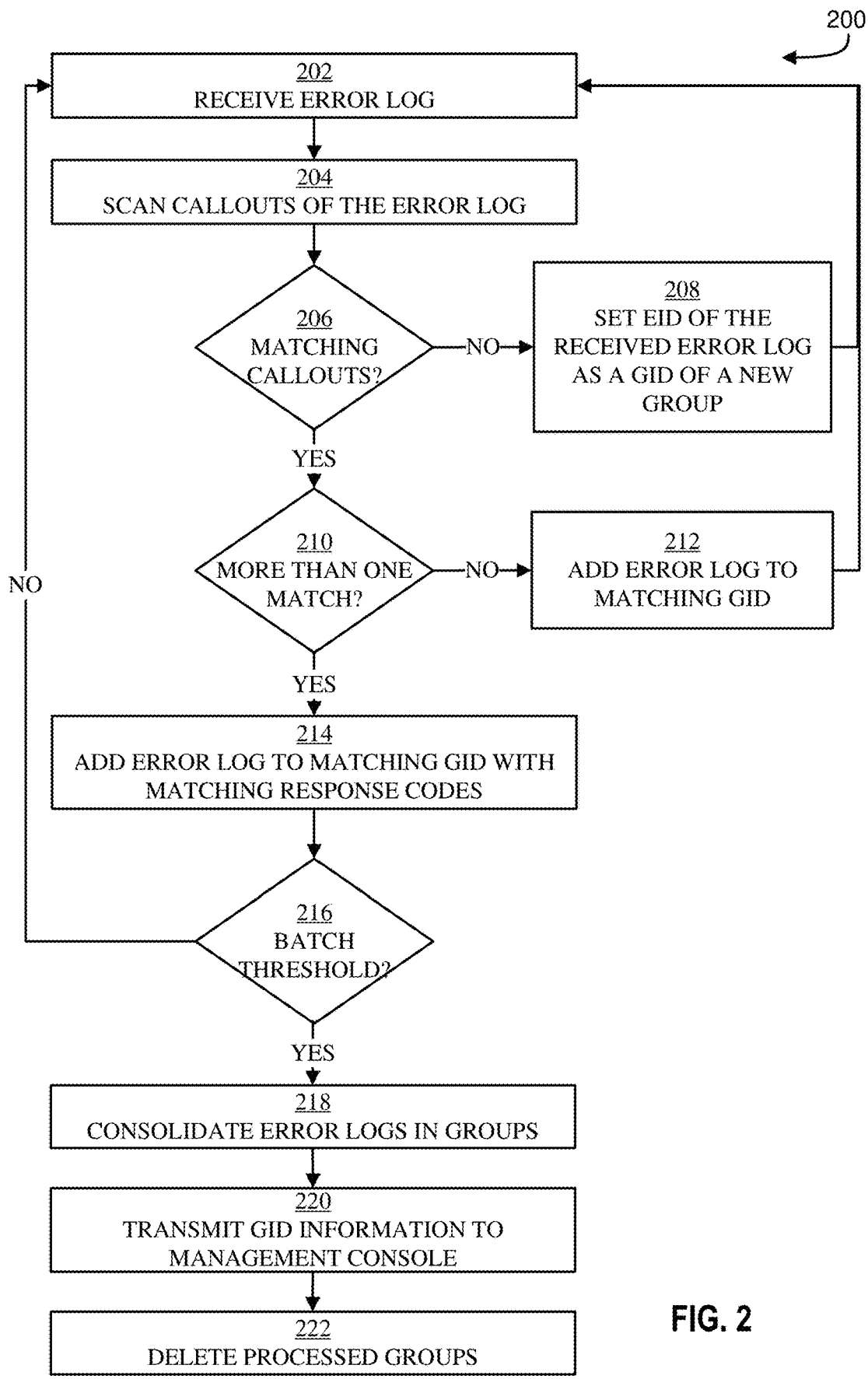
FIG. 2 illustrates a flowchart of an example method for efficiently maintaining error logs, in accordance with some embodiments of the present disclosure.

FIG. 2 illustrates a flowchart of an example method 200 for efficiently maintaining error logs, in accordance with some embodiments of the present disclosure. The method 200 can be implemented by, for example, a processor, a computer, a service processor 102, or another aspect of FIG. 1 or FIG. 4.

Operation 202 includes receiving an error log 110. Error logs 110 can be received from one or more components 124 (e.g., servers) communicatively coupled to a service processor 102 (e.g., a BMC).

Operation 204 includes scanning callouts 112 of the received error log 110. Operation 204 can be performed by, for example, a log daemon of 118 of service processor 102. Operation 204 can generate a callout chain 120 of the received error log 110.

Operation 206 includes determining if the scanned callouts 112 of the received error log 110 match scanned callouts of at least one previous error log. Operation 206 can compare the callouts 112 of the received error log 110 to callouts of previous error logs stored in the service processor log 106. In some embodiments, operation 206 includes comparing the callout chain 120 of the received error log 110 to callout chains 120 of previous error logs. A match can be identified if a first callout chain in a first error log matches at least a portion of another callout chain in another error log. In some embodiments, additional testing is performed to determine if error-logs with non-matching callout chains 120 are, in fact, related. This is discussed in more detail hereinafter with respect to FIG. 3C.

If there is no match (206: NO), then the method 200 proceeds to operation 208 and instantiates a new group 108 in the service processor log 106 by setting the Entry Identifier (EID) of the received error log 110 as a Group Identifier (GID) of the instantiated group 108 and adding the received error log 110 to the instantiated group 108. The method 200 then returns to operation 202 and continues processing incoming error logs 110.

If there is at least one match (206: YES), then the method 200 proceeds to operation 210 and determines if there is more than one previous error log having callouts matching the callouts 112 of the received error log 110. If not (210: NO), then the method 200 proceeds to operation 212 and the received error log 110 is added to the existing group 108 having a previous error log with the only matching callouts. The method 200 then returns to operation 202 and continues processing incoming error logs 110.

If there is more than one match (210: YES), then the method 200 proceeds to operation 214 and adds the received error log 110 to the group 108 with a previous error log that has both matching callouts 112 and matching response codes 114 as the received error log 110. Thus, operation 214 can include comparing response codes 114 of the received error log 110 with response codes of the two or more error logs with matching callouts as the received error log 110.

Operation 216 includes determining if a batch threshold is satisfied. The batch threshold can be used to determine when to transmit information related to a group 108 of error logs 110 to the management console 104. The batch threshold can be, for example, a number of error logs 110 in any given group 108 of error logs (e.g., at least two, at least five, etc.), an amount of time expired since a given group 108 of error logs 110 is instantiated (e.g., ten minutes, an hour, a day, etc.), an amount of time expired since receiving a new error log 110 in a given group 108 (e.g., ten minutes, an hour, a day, etc.), another threshold, or a combination of any of the aforementioned thresholds.

If the batch threshold is not satisfied (216: NO), then the method 200 returns to operation 202 and continues processing additional received error logs 110. If the batch threshold is satisfied (216: YES), then the method 200 proceeds to operation 218 and consolidates error logs 110 within groups 108. In some embodiments at least one error log 110 is deleted from a group 108 such that at least one error log 110 remains in the group 108, thereby removing redundant information. Operation 218 is discussed in more detail hereinafter with respect to FIG. 3B. Advantageously, deleting redundant error logs 110 from groups 108 reduces the storage required in the service processor log 106 while also reducing the network bandwidth required to transmit information related to a group 108 to the management console 104.

Operation 220 includes transmitting information related to a group 108 of error logs 110 to the management console 104. In some embodiments, operation 220 includes performing a call-home operation. In some embodiments, operation 220 transmits the information related to a group 108 of error logs 110 to the management console 104 using an Ethernet connection. In some embodiments, operation 220 includes transmitting each error log 110 in a group 108 to the management console 104, transmitting a single representative error log 110 of the group 108 to the management console 104, or transmitting a summary of information drawn from one or more error logs 110 in the group 108 to the management console 104.

Advantageously, transmitting groups 108 of related error logs 110 improves availability of components 124 by batching related error logs together in groups. Doing so expedites automatic and/or manual resolution of errors by reducing the overhead of manually determining which error logs are related to a same root cause.

Operation 222 includes deleting processed groups 108. Operation 222 can include determining that a group 108 is successfully transmitted to the management console 104 (or successfully attempted to be transmitted to the management console 104), and in response to the determination, deleting the group 108. Operation 222 is discussed in more detail hereinafter with respect to FIG. 3A. Advantageously, deleting processed groups 108 reduces the storage required in the service processor log 106.

Figure 3A:
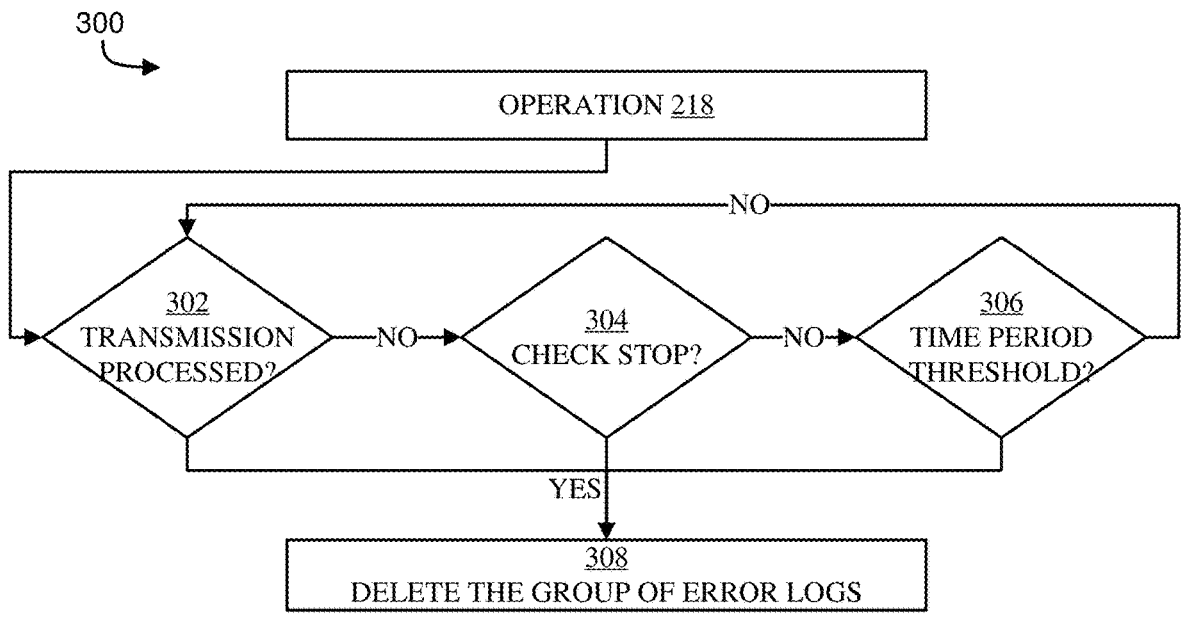
FIG. 3A illustrates a flowchart of an example method for deleting processed groups of error logs, in accordance with some embodiments of the present disclosure.

FIG. 3A illustrates a flowchart of an example method 300 for deleting processed groups of error logs, in accordance with some embodiments of the present disclosure. The method 300 can be implemented by, for example, a processor, a computer, a service processor 102, or another aspect of FIG. 1 or FIG. 4. In some embodiments, the method 300 is a sub-method of operation 222 of FIG. 2.

The method 300 can occur in response to execution of operation 218 of FIG. 2, where information relating to a group 108 of error logs 110 is transmitted to a management console 104. In response to operation 218, operation 302 can include determining if the transmitted information is processed by the management console 104. In some embodiments, operation 302 can include determining whether or not an acknowledgement (ack) is received from the management console 104 in response to transmitting the information. If so (302: YES), then the method 300 can proceed to operation 308 and delete the group 108 of error logs 110 corresponding to the transmitted information. If not (302: NO), then the method 300 can proceed to operation 304.

Operation 304 includes determining whether or not a check stop was identified as a result of performing operation 218 of FIG. 2. A check stop can indicate a stop in a chain of failures, thereby indicating no further action is to be taken. If so (304: YES), then the method 300 proceeds to operation 308 and deletes the group 108 of error logs 110 corresponding to the transmitted information. If not (304: NO), then the method 300 proceeds to operation 306.

Operation 306 includes determining whether or not a time period threshold is expired. The time period threshold can be minutes, hours, days, or another time period measured from the time the information is transmitted to the management console 104 in operation 218 of FIG. 2. If the so (306: YES), then the method 300 proceeds to operation 308 and deletes the group 108 of error logs 110 corresponding to the transmitted information. If not (306: NO), then the method 300 returns to operation 302 until at least one of operations 302, 304, or 306 results in a positive determination.

Advantageously, the method 300 reduces the number of groups 108 stored in the service processor log 106 at any given time by deleting those groups 108 that have been sent to the management console 104. Doing so reduces the required size of the service processor log 106. Further, doing so increases accuracy of the system 100. For example, by purging the service processor log 106 of transmitted groups 108, the system 100 avoids associating a new error log indicating a second occurrence of a previous problem to a group 108 of error logs 110 for the previous problem.

Figure 3B:
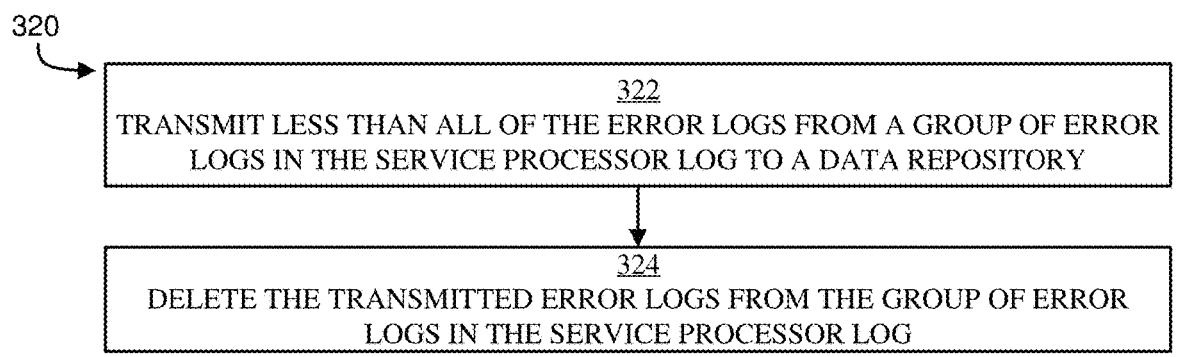
FIG. 3B illustrates a flowchart of an example method for consolidating error logs within a group of error logs, in accordance with some embodiments of the present disclosure.

FIG. 3B illustrates a flowchart of an example method 320 for consolidating error logs within a group of error logs, in accordance with some embodiments of the present disclosure. The method 320 can be implemented by, for example, a processor, a computer, a service processor 102, or another aspect of FIG. 1 or FIG. 4. In some embodiments, the method 320 is a sub-method of operation 218 of FIG. 2.

Operation 322 includes transmitting less than all of the error logs from a group 108 of error logs 110 in the service processor log 106 to a data repository 122. In some embodiments, operation 322 transmits all but a predetermined number of error logs (e.g., all but one error log) in the group of error logs 110 to the data repository 122.

Operation 324 includes deleting the transmitted error logs from the group 108 of error logs 110 in the service processor log 106 in response to performing operation 322. Advantageously, the method 320 reduces the number of error logs 110 stored in groups 108 of the service processor log 106 by removing redundant error logs 110, thereby using fewer storage resources of the service processor log 106. Further, reducing the number of error logs 110 per group 108 reduces the network bandwidth required to transmit information related to a group 108 of error logs 110 to the management console 104.

Figure 3C:
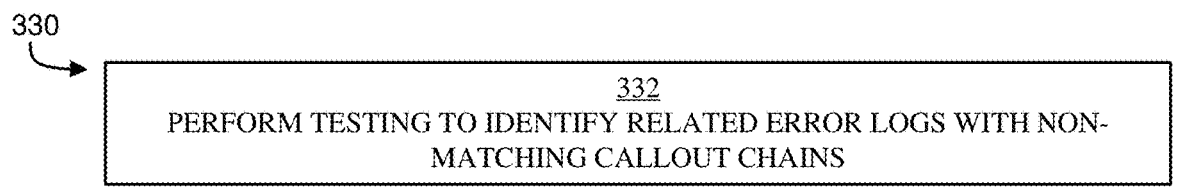
FIG. 3C illustrates a flowchart of an example method for correlating error logs with different callout chains, in accordance with some embodiments of the present disclosure.

FIG. 3C illustrates a flowchart of an example method 330 for correlating error logs 110 with different callout chains 120, in accordance with some embodiments of the present disclosure. The method 330 can be implemented by, for example, a processor, a computer, a service processor 102, or another aspect of FIG. 1 or FIG. 4. In some embodiments, the method 330 is a sub-method of operation 206 of FIG. 2.

Operation 332 includes performing testing to identify related error logs 110 with non-matching callout chains 120. As will be appreciated by one skilled in the art, the nature of error logs 110 and interrelated failures can sometimes cause related errors to have different callout chains 120. Having different callout chains 120, as used herein, can refer to non-identical callout chains, or two callout chains in which no portion of (or the entirety of) one callout chain is included, at least as a subset, of another callout chain. In order to resolve such situations, aspects of the present disclosure can perform customized test procedures to identify related error logs 110 despite differences in callout chains 120.

For example, aspects of the present disclosure can run FRU test procedures which check if a FRU that has a pervasive impact (e.g., according to a FRU association table) is faulty. As one example, a problem with a system reference clock can cause errors that callout processors. In this case if there is an error log 110 with a callout 112 to the system reference clock, then aspects of the present disclosure can perform a system reference clock test procedure. If the system reference clock test procedure fails, then error logs 110 with callouts 112 identifying the processors can be grouped with error logs 110 with callouts 112 to the system reference clock, or the redundant error logs 110 with callouts 112 identifying the processors can be deleted or otherwise consolidated.

As another example, if an error log 110 includes a callout 112 identifying a first FRU with a bus interconnect to a second FRU, then aspects of the present disclosure can run a bus test procedure to check if there are errors on the bus. If so, error logs 110 with callouts 112 to FRUs connected to the bus can be grouped together.

As yet another example, if there is overreporting of errors indicating a firmware update, aspects of the present disclosure can examine the error reference codes to identify a common failing firmware module.

Further, embodiments of the present disclosure contemplate various resolutions for possible challenges related to performing testing to identify related error logs 110 with non-matching callout chains 120. As an example, a redundant FRU can automatically replace a failed FRU and a fault in the failed FRU may no longer detected. Referring back to the reference clock example discussed above, if there is a redundant system reference clock, a clock test procedure would not find a lack of clock signals because the procedure will test the redundant (functioning) system reference clock rather than the original (failed) system reference clock. To overcome this, embodiments of the present disclosure can temporarily reconfigure the faulty, deconfigured component exclusively for purposes of testing the faulty, deconfigured component.

Further challenges relate to situations where two or more associated FRUs have faults (e.g., a processor and a clock). In such cases, both errors should be reported individually (e.g., rather than grouping the processor error and the clock error in the same group). To address this, aspects of the present disclosure can implement a virtual FRU in the associated data processing system to isolate a test to specific FRUs of interest. Using a virtual FRU can mask errors from a faulty FRU so that the test can identify possible issues on other FRUs. This can be useful for determining whether an error on a first FRU is a result of a failure on the first FRU or a dependency failure based on a failed, second FRU that interacts with the first FRU.

Further challenges related to situations where different firmware stacks (e.g., BMC and Host) are operating on two endpoint FRUs of a bus. The different firmware stacks may perform error filtering in different ways. Aspects of the present disclosure are configured to delegate error filtering to one of the two firmware stacks, and the other firmware stack can provide a list of error logs to examine at the delegated firmware stack.

Figure 4:
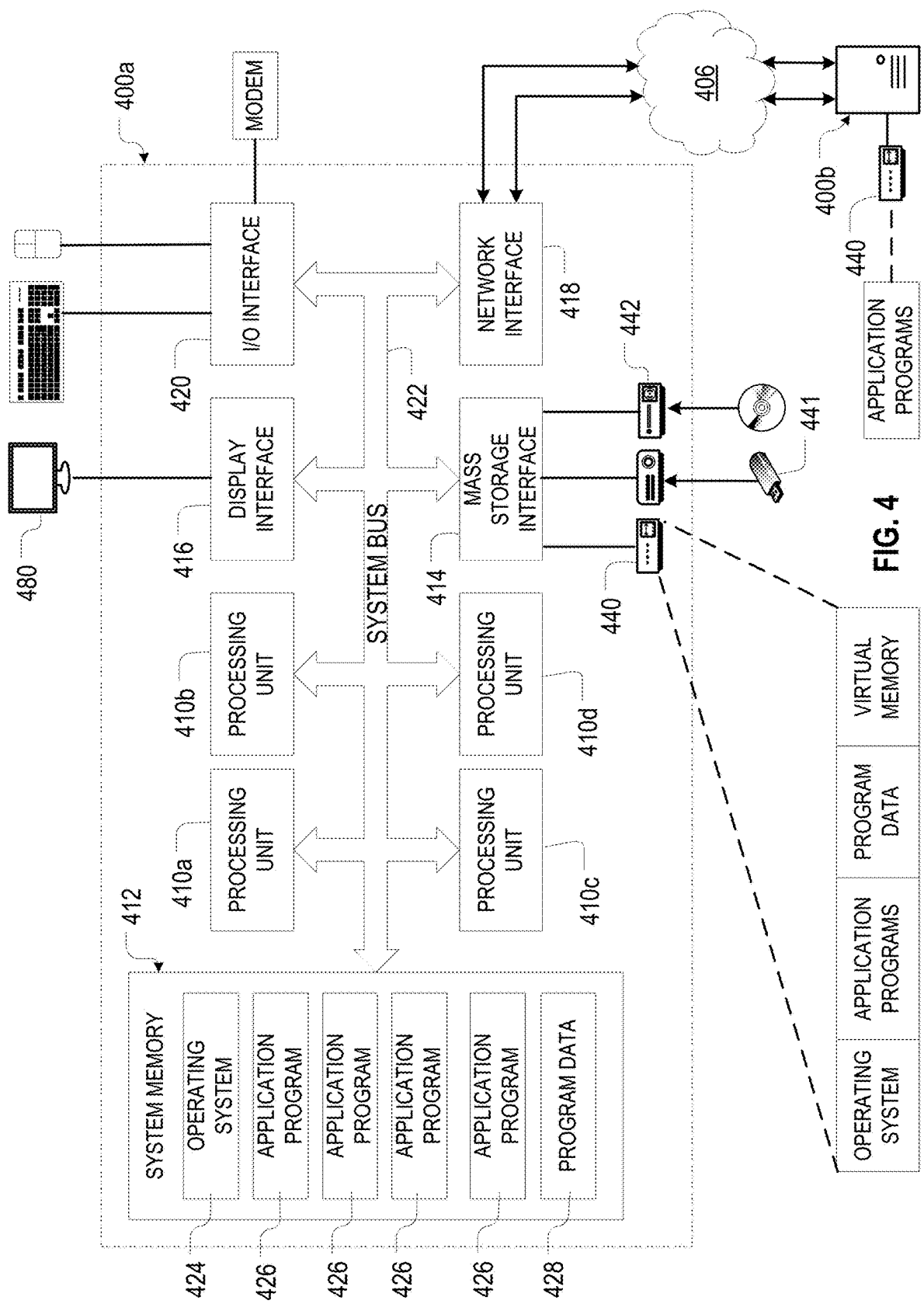
FIG. 4 illustrates a block diagram of an example data processing system, in accordance with some embodiments of the present disclosure.

FIG. 4 illustrates one embodiment of a data processing system (DPS) 400a, 400b (herein generically referred to as a DPS 400, a computing system, or a computer system), consistent with some embodiments. FIG. 4 only depicts the representative major components of the DPS 400, and those individual components may have greater complexity than represented in FIG. 4. In some embodiments, the DPS 400 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 4 may be present, and that the number, type, and configuration of such components may vary.

The DPS 400 in FIG. 4 may comprise a plurality of processing units 410a-110d (generically, processor 410 or CPU 410) that may be connected to a main memory 412, a mass storage interface 414, a terminal/display interface 416, a network interface 418, and an input/output ("I/O") interface 420 by a system bus 422. The mass storage interfaces 414 in this embodiment may connect the system bus 422 to one or more mass storage devices, such as a direct access storage device 440, a USB drive 441, and/or a readable/writable optical disk drive 442. The network interfaces 418 may allow the DPS 400a to communicate with other DPS 400b over a network 406. The main memory 412 may contain an operating system 424, a plurality of application programs 426, and program data 428.

The DPS 400 embodiment in FIG. 4 may be a general-purpose computing device. In these embodiments, the processors 410 may be any device capable of executing program instructions stored in the main memory 412, and may themselves be constructed from one or more microprocessors and/or integrated circuits. In some embodiments, the DPS 400 may contain multiple processors and/or processing cores, as is typical of larger, more capable computer systems; however, in other embodiments, the DPS 400 may only comprise a single processor system and/or a single processor designed to emulate a multiprocessor system. Further, the processor(s) 410 may be implemented using a number of heterogeneous DPSs 400 in which a main processor 410 is present with secondary processors on a single chip. As another illustrative example, the processor(s) 410 may be a symmetric multiprocessor system containing multiple processors 410 of the same type When the DPS 400 starts up, the associated processor(s) 410 may initially execute program instructions that make up the operating system 424. The operating system 424, in turn, may manage the physical and logical resources of the DPS 400. These resources may include the main memory 412, the mass storage interface 414, the terminal/display interface 416, the network interface 418, and the system bus 422. As with the processor(s) 410, some DPS 400 embodiments may utilize multiple system interfaces 414, 416, 418, 420, and buses 422, which in turn, may each include their own separate, fully programmed microprocessors.

Instructions for the operating system 424 and/or application programs 426 (generically, "program code," "computer usable program code," or "computer readable program code") may be initially located in the mass storage devices, which are in communication with the processor(s) 410 through the system bus 422. The program code in the different embodiments may be embodied on different physical or tangible computer-readable media, such as the memory 412 or the mass storage devices. In the illustrative example in FIG. 4, the instructions may be stored in a functional form of persistent storage on the direct access storage device 440. These instructions may then be loaded into the main memory 412 for execution by the processor(s) 410. However, the program code may also be located in a functional form on the computer-readable media, such as the direct access storage device 440 or the readable/writable optical disk drive 442, that is selectively removable in some embodiments. It may be loaded onto or transferred to the DPS 400 for execution by the processor(s) 410.

With continuing reference to FIG. 4, the system bus 422 may be any device that facilitates communication between and among the processor(s) 410; the main memory 412; and the interface(s) 414, 416, 418, 420. Moreover, although the system bus 422 in this embodiment is a relatively simple, single bus structure that provides a direct communication path among the system bus 422, other bus structures are consistent with the present disclosure, including without limitation, point-to-point links in hierarchical, star or web configurations, multiple hierarchical buses, parallel and redundant paths, etc.

The main memory 412 and the mass storage device(s) 440 may work cooperatively to store the operating system 424, the application programs 426, and the program data 428. In some embodiments, the main memory 412 may be a random-access semiconductor memory device ("RAM") capable of storing data and program instructions. Although FIG. 4 conceptually depicts that the main memory 412 as a single monolithic entity, the main memory 412 in some embodiments may be a more complex arrangement, such as a hierarchy of caches and other memory devices. For example, the main memory 412 may exist in multiple levels of caches, and these caches may be further divided by function, such that one cache holds instructions while another cache holds non-instruction data that is used by the processor(s) 410. The main memory 412 may be further distributed and associated with a different processor(s) 410 or sets of the processor(s) 410, as is known in any of various so-called non-uniform memory access (NUMA) computer architectures. Moreover, some embodiments may utilize virtual addressing mechanisms that allow the DPS 400 to behave as if it has access to a large, single storage entity instead of access to multiple, smaller storage entities (such as the main memory 412 and the mass storage device 440).

Although the operating system 424, the application programs 426, and the program data 428 are illustrated in FIG. 4 as being contained within the main memory 412 of DPS 400a, some or all of them may be physically located on a different computer system (e.g., DPS 400b) and may be accessed remotely, e.g., via the network 406, in some embodiments. Moreover, the operating system 424, the application programs 426, and the program data 428 are not necessarily all completely contained in the same physical DPS 400a at the same time, and may even reside in the physical or virtual memory of other DPS 400b.

The system interfaces 414, 416, 418, 420 in some embodiments may support communication with a variety of storage and I/O devices. The mass storage interface 414 may support the attachment of one or more mass storage devices 440, which may include rotating magnetic disk drive storage devices, solid-state storage devices (SSD) that uses integrated circuit assemblies as memory to store data persistently, typically using flash memory or a combination of the two. Additionally, the mass storage devices 440 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 420 may support attachment of one or more I/O devices, such as a keyboard 481, mouse 482, modem 483, or printer (not shown).

The terminal/display interface 416 may be used to directly connect one or more displays 480 to the DPS 400. These displays 480 may be non-intelligent (i.e., dumb) terminals, such as an LED monitor, or may themselves be fully programmable workstations that allow IT administrators and users to communicate with the DPS 400. Note, however, that while the display interface 416 may be provided to support communication with one or more displays 480, the DPS 400 does not necessarily require a display 480 because all needed interaction with users and other processes may occur via the network 406.

The network 406 may be any suitable network or combination of networks and may support any appropriate protocol suitable for communication of data and/or code to/from multiple DPS 400. Accordingly, the network interfaces 418 may be any device that facilitates such communication, regardless of whether the network connection is made using present-day analog and/or digital techniques or via some networking mechanism of the future. Suitable networks 406 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 406. The Transmission Control Protocol/Internet Protocol ("TCP/IP") suite contains a suitable network and transport protocols.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in FIG. 4 and/or any software configured to perform any portion of the method described with respect to FIGS. 2, 3A, 3B and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a system comprising: a Baseboard Management Controller (BMC) communicatively coupled to a plurality of servers, wherein the BMC comprises: a log daemon configured to scan incoming error logs from the plurality of servers, wherein the log daemon creates callout chains of callouts of the incoming error logs; and a Flash memory storing a service processor log including a plurality of groups of error logs, wherein a first group of error logs contains at least two error logs that have matching callout chains.

Example 2 is a system according to Example 1, wherein the BMC further comprises: a log maintainer configured to maintain the service processor log by: transmitting less than all error logs of at least one group of the plurality of groups to an external data repository; and deleting the less than all error logs in response to transmitting the less than all error logs to the external data repository.

Example 3 is a system according to any one of Examples 1 or 2, further comprising: a management console communicatively coupled to the BMC, wherein the management console generates a maintenance resolution plan for each of the plurality of groups.

Example 4 is a computer-implemented method. The method comprises determining, by a service processor, that a first set of callouts of a first error log matches a previous set of callouts of a previous error log; combining the first error log with the previous error log in a first group in a service processor log of the service processor; and transmitting information related to the first group to a management console communicatively coupled to the service processor.

Example 5 is a method according to Example 4, wherein a first callout of the first set of callouts includes a location code and a response code.

Example 6 is a method according to any one of Examples 4 or 5, further comprising: prior to receiving the first error log, determining that the previous set of callouts of the previous error log does not match any set of callouts stored in the service processor log; and creating the first group in the service processor log including the previous error log.

Example 7 is a method according to Example 6, wherein the first group includes a group identifier (GID) that is set to an entry identifier (EID) of the previous error log.

Example 8 is a method according to any one of Examples 4 to 7, further comprising: determining, for a second error log, that a second set of callouts of the second error log matches the previous set of callouts of the previous error log in the first group and a third set of callouts of a third error log in a second group; matching a second set of response codes of the second error log to a previous set of response codes of the previous error log; and adding the second error log to the first group based on matching the second set of response codes of the second error log to the previous set of response codes of the previous error log.

Example 9 is a method according to Example 8, wherein the second set of response codes of the second error log does not match a third set of response codes of the third error log.

Example 10 is a method according to any one of Examples 4 to 9, further comprising: transmitting at least one error log in the first group and excluding the previous error log to an external data repository; and deleting the at least one error log in response to transmitting the at least one error log to the external data repository.

Example 11 is a method according to any one of Examples 4 to 10, further comprising: receiving an acknowledgement from the management console in response to transmitting the information; and deleting the first group in response to receiving the acknowledgement.

Example 12 is a method according to any one of Examples 4 to 10, further comprising: detecting a check stop in response to transmitting the information; and deleting the first group in response to detecting the check stop.

Example 13 is a method according to any one of Examples 4 to 10, further comprising: detecting an expiration of a time threshold in response to transmitting the information; and deleting the first group in response to detecting the expiration of the time threshold.

Example 14 is a computer program product comprising one or more computer readable storage media, and program instructions collectively stored on the one or more computer readable storage media, the program instructions comprising instructions configured to cause one or more processors to perform a method according to any one of Examples 4 to 13.

What is claimed is:

1. A computer-implemented method comprising:
   determining, by a service processor, that a first set of callouts of a first error log matches a previous set of callouts of a previous error log;
   combining the first error log with the previous error log in a first group in a service processor log of the service processor;
   transmitting at least one error log in the first group and excluding the previous error log to an external data repository;
   deleting the at least one error log in response to transmitting the at least one error log to the external data repository;
   transmitting information related to the previous error log and representative of the first group to a management console communicatively coupled to the service processor;
   receiving an acknowledgement from the management console in response to transmitting the information; and
   deleting the first group in response to receiving the acknowledgement.

2. The method of claim 1, wherein a first callout of the first set of callouts includes a location code and a response code.

3. The method of claim 1, further comprising:
   prior to receiving the first error log, determining that the previous set of callouts of the previous error log does not match any set of callouts stored in the service processor log; and
   creating the first group in the service processor log including the previous error log.

4. The method of claim 3, wherein the first group includes a group identifier (GID) that is set to an entry identifier (EID) of the previous error log.

5. The method of claim 1, further comprising:
   determining, for a second error log, that a second set of callouts of the second error log matches the previous set of callouts of the previous error log in the first group and a third set of callouts of a third error log in a second group;
   matching a second set of response codes of the second error log to a previous set of response codes of the previous error log; and
   adding the second error log to the first group based on matching the second set of response codes of the second error log to the previous set of response codes of the previous error log.

6. The method of claim 5, wherein the second set of response codes of the second error log does not match a third set of response codes of the third error log.

7. The method of claim 1, wherein the at least one error log in the first group is all error logs in the first group excluding the previous error log.

8. A computer program product comprising one or more computer readable storage media, and program instructions collectively stored on the one or more computer readable storage media, the program instructions comprising instructions configured to cause one or more processors to perform a method comprising:
   determining that a first set of callouts of a first error log matches a previous set of callouts of a previous error log;
   combining the first error log with the previous error log in a first group in a service processor log of the service processor;
   transmitting at least one error log in the first group and excluding the previous error log to an external data repository;
   deleting the at least one error log in response to transmitting the at least one error log to the external data repository;
   transmitting information related to the previous error log and representative of the first group to a management console communicatively coupled to the one or more processors;
   receiving an acknowledgement from the management console in response to transmitting the information; and
   deleting the first group in response to receiving the acknowledgement.

9. The computer program product of claim 8, the program instructions comprising additional instructions configured to cause one or more processors to perform the method further comprising:

prior to receiving the first error log, determining that the previous set of callouts of the previous error log does not match any set of callouts stored in the service processor log; and creating the first group in the service processor log including the previous error log.

10. The computer program product of claim 9, wherein the first group includes a group identifier (GID) that is set to an entry identifier (EID) of the previous error log.

11. The computer program product of claim 8, the program instructions comprising additional instructions configured to cause one or more processors to perform the method further comprising:

determining, for a second error log, that a second set of callouts of the second error log matches the previous set of callouts of the previous error log in the first group and a third set of callouts of a third error log in a second group;

matching a second set of response codes of the second error log to a previous set of response codes of the previous error log; and adding the second error log to the first group based on matching the second set of response codes of the second error log to the previous set of response codes of the previous error log.

12. The computer program product of claim 11, wherein the second set of response codes of the second error log does not match a third set of response codes of the third error log.

13. The computer program product of claim 8, wherein the at least one error log in the first group is all error logs in the first group excluding the previous error log.

14. A system comprising:

one or more processors; and one or more computer-readable storage media storing program instructions which, when executed by the one or more processors, are configured to cause the one or more processors to perform a method comprising:

determining that a first set of callouts of a first error log matches a previous set of callouts of a previous error log;

combining the first error log with the previous error log in a first group in a service processor log of the service processor;

transmitting at least one error log in the first group and excluding the previous error log to an external data repository;

deleting the at least one error log in response to transmitting the at least one error log to the external data repository;

transmitting information related to the previous error log and representative of the first group to a management console communicatively coupled to the one or more processors;

receiving an acknowledgement from the management console in response to transmitting the information; and deleting the first group in response to receiving the acknowledgement.

15. The system of claim 14, the one or more computer-readable storage media storing additional program instructions configured to cause the one or more processors to perform the method further comprising:

prior to receiving the first error log, determining that the previous set of callouts of the previous error log does not match any set of callouts stored in the service processor log; and creating the first group in the service processor log including the previous error log.

16. The system of claim 15, wherein the first group includes a group identifier (GID) that is set to an entry identifier (EID) of the previous error log.

17. The system of claim 14, the one or more computer-readable storage media storing additional program instructions configured to cause the one or more processors to perform the method further comprising:

determining, for a second error log, that a second set of callouts of the second error log matches the previous set of callouts of the previous error log in the first group and a third set of callouts of a third error log in a second group;

matching a second set of response codes of the second error log to a previous set of response codes of the previous error log; and adding the second error log to the first group based on matching the second set of response codes of the second error log to the previous set of response codes of the previous error log.

18. The system of claim 17, wherein the second set of response codes of the second error log does not match a third set of response codes of the third error log.

19. The system of claim 14, wherein the at least one error log in the first group is all error logs in the first group excluding the previous error log.

20. The system of claim 14, wherein a first callout of the first set of callouts includes a location code and a response code.

* * * * *